United States Patent
Liang et al.

(10) Patent No.: US 9,386,460 B2
(45) Date of Patent: Jul. 5, 2016

(54) SYSTEMS AND METHODS FOR CARRIER AGGREGATION DEPLOYMENT AND ORGANIZATION IN UNLICENSED BANDS

(71) Applicant: APPLE INC., Cupertino, CA (US)

(72) Inventors: Huarui Liang, Cupertino, CA (US); Tarik Tabet, Cupertino, CA (US); Dawei Zhang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 147 days.

(21) Appl. No.: 14/094,327

(22) Filed: Dec. 2, 2013

(65) Prior Publication Data

US 2015/0156635 A1 Jun. 4, 2015

(51) Int. Cl.
| | |
|---|---|
| *H04W 16/14* | (2009.01) |
| *H04W 28/04* | (2009.01) |
| *H04W 48/16* | (2009.01) |
| *H04W 36/00* | (2009.01) |
| *H04J 11/00* | (2006.01) |
| *H04L 5/00* | (2006.01) |
| *H04L 27/00* | (2006.01) |

(52) U.S. Cl.
CPC .......... *H04W 16/14* (2013.01); *H04J 11/0093* (2013.01); *H04L 5/001* (2013.01); *H04L 27/0006* (2013.01); *H04W 28/048* (2013.01); *H04W 36/0061* (2013.01); *H04W 48/16* (2013.01); *H04L 5/0098* (2013.01)

(58) Field of Classification Search
None
See application file for complete search history.

(56) References Cited

U.S. PATENT DOCUMENTS

| | | | |
|---|---|---|---|
| 2010/0281486 A1* | 11/2010 | Lu et al. | 718/104 |
| 2012/0307744 A1* | 12/2012 | Charbit et al. | 370/329 |
| 2014/0018120 A1* | 1/2014 | Anbe | 455/509 |
| 2014/0156820 A1* | 6/2014 | Moineau | 709/223 |
| 2014/0200005 A1* | 7/2014 | Wegmann et al. | 455/436 |
| 2015/0063099 A1* | 3/2015 | Sadek | 370/229 |
| 2015/0156635 A1* | 6/2015 | Liang et al. | 370/328 |

FOREIGN PATENT DOCUMENTS

| | | |
|---|---|---|
| GB | 2 490 110 | 10/2012 |
| WO | 2012/116489 | 9/2012 |

(Continued)

OTHER PUBLICATIONS

Andreas Roessler: "Cell search and cell selection in UMTS LTE Application Note", , Sep. 17, 2009, XP055169135, http://www.rohde-schwarz.com/en/applications/cell-search-and-cell-selection-in-umts-lte-application-note_56280-15428.html Retrieved from the Internet: URL:http://cdn.rohde-schwarz.com/pws/dl_downloads/dl_application/application_notes/1ma150/1MA150_0E_cell_searchselection_in_LTE.PDF [retrieved on Feb. 11, 2015].

(Continued)

*Primary Examiner* — Benjamin H Elliott, IV
(74) *Attorney, Agent, or Firm* — Fay Kaplun & Marcin, LLP

(57) ABSTRACT

Described herein are systems and methods for carrier aggregation deployment and organization in unlicensed bands. A method may comprise scanning, by a transceiver within a base station, channels in a band of interest, reporting, by the transceiver, signal measurement information to the base station, cell searching, by the transceiver, channels in the band of interest, determining channel information for neighboring each channel, and transmitting, by the transceiver, the channel information to the base station.

16 Claims, 7 Drawing Sheets

(56) References Cited

FOREIGN PATENT DOCUMENTS

WO 2012/141628 10/2012
WO 2013/126843 8/2013

OTHER PUBLICATIONS

"3rd Generation Partnership Project; Technical Specification Group Radio Access Network" Evolved Universal Terrestrial Radio Access (E-UTRA) and Evolved Universal Terrestrial Radio Access Network (E-UTRAN); Overall description; Stage 2 (Release 11) 3GPP Standard; 3GPP TS 36.300, 3rd Generation Partnership Project (3GPP), Mobile Competence Centre ; 650, Route Des Lucioles ; F-06921 Sophia-Antipolis Cedex ; France , vol. RAN WG2 No. V11.7.0, Sep. 19, 2013, pp. 56-60 p. 82-93 p. 163-187.

* cited by examiner

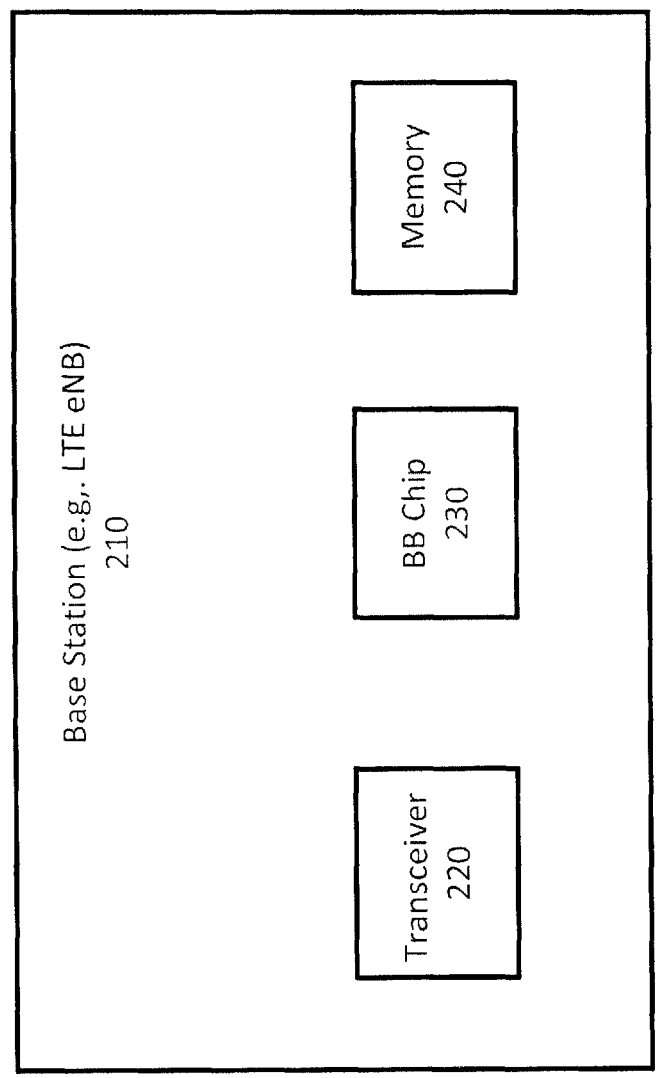

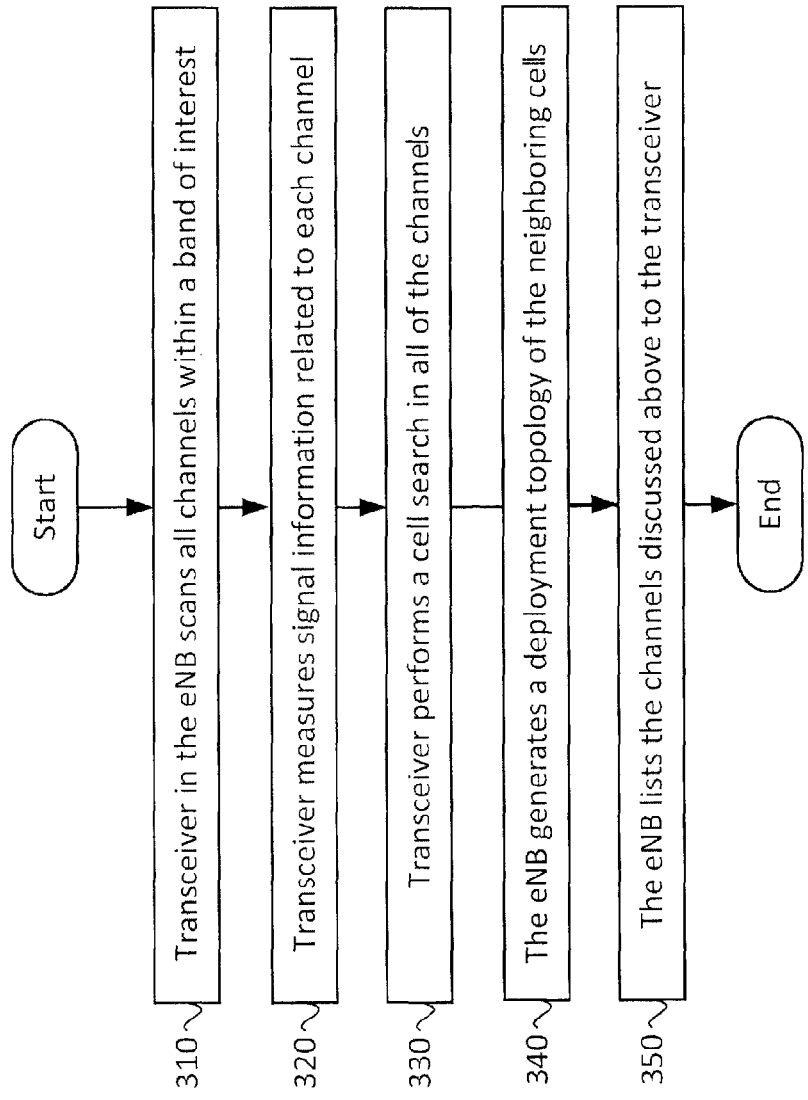

F I G. 4
System Information Block 400

| SIB-1 | Cell access related parameters and scheduling of other SIBs |
|---|---|
| SIB-2 | Common and shared channel configuration, RACH related configuration are present |
| SIB-3 | Parameters required for intra-frequency, inter-frequency and I-RAT cell re-selections |
| SIB-4 | Information regarding INTRA-frequency neighboring cells (E-UTRA) |
| SIB-5 | Information regarding INTER-frequency neighboring cells (E-UTRA) |
| SIB-6 | Information for re-selection to INTER-RAT (UTRAN cells) |
| SIB-7 | Information for re-selection to INTER-RAT (GERAN cells) |
| SIB-8 | Information for re-selection to INTER-RAT (CDMA2000) |
| SIB-9 | Information related to Home eNodeB (FEMTOCELL) |
| SIB-10 | ETWS (Earthquake and Tsunami Warning System) Information (Primary notification) |
| SIB-11 | ETWS (Earthquake and Tsunami Warning System) Information (Secondary notification) |
| SIB-12 | Commertial Mobile Alert Service (CMAS) information |
| SIB-13 | Contains the information required to aquire the MBMS control information associated with one or more MBSFN areas |

FIG. 5

RRC Messages 500

```
SCellToAddMod-r10 ::=              SEQUENCE (
      sCellIndex-r10                     SCellIndex-r10,
      cellIdentification-r10             SEQUENCE (
            physCellId-r10                     PhysCellId,
            dl-CarrierFreq-r10                 ARFCN-ValueEUTRA
      )                                                              OPTIONAL,  -- Cond SCellAdd
      radioResourceConfigCommonSCell-r10       RadioResourceConfigCommonSCell-r10   OPTIONAL,  -- Cond
SCellAdd
      radioResourceConfigDedicatedSCell-r10    RadioResourceConfigDedicatedSCell-r10  OPTIONAL, --
Cond SCellAdd2
      ...
)
```

System 620

System 610

System 630

SYSTEMS AND METHODS FOR CARRIER AGGREGATION DEPLOYMENT AND ORGANIZATION IN UNLICENSED BANDS

BACKGROUND

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10, namely, the LTE-Advanced standard, to provide wider than 20 MHz transmission bandwidth to a single device (e.g., user equipment or "UE") while maintaining the backward compatibility with legacy UEs.

Under the current standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 1, five component carriers may each have a bandwidth of 20 MHz to combine for a maximum total bandwidth of 100 MHz. With carrier aggregation features enabled, the LTE-Advanced standard may meet International Mobile Telecommunications ("IMT") Advanced's peak downlink ("DL") throughput requirement, or 1 Gbps.

DESCRIPTION OF THE DRAWINGS

FIG. 2 shows an exemplary system for carrier aggregation deployment and organization in an unlicensed band according to an embodiment described herein.

FIG. 3 shows an exemplary method for carrier aggregation deployment and organization in an unlicensed band according to an embodiment described herein.

FIG. 4 shows an exemplary SIB data provided by the cells during the search according to an embodiment described herein.

FIG. 5 shows exemplary RRC messages provided used by the LTE eNB according to an embodiment described herein.

DETAILED DESCRIPTION

Figure 1:
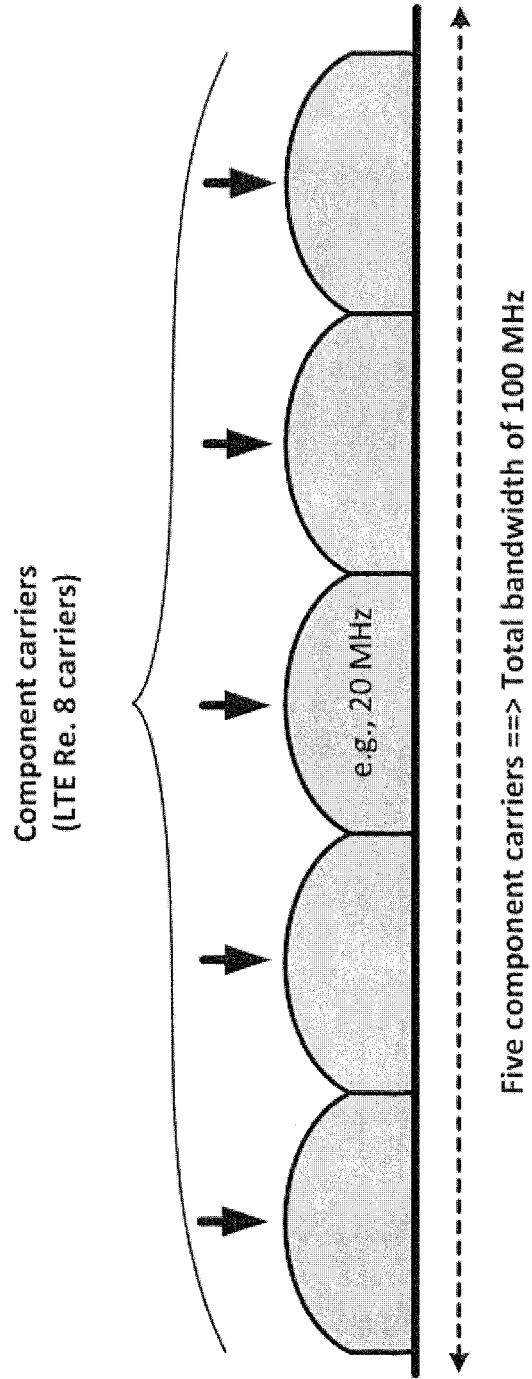
FIG. 1 (discussed above) shows an example of carrier aggregation including five component carriers having a bandwidth of 20 MHz for a total bandwidth of 100 MHz.

Described herein are systems and methods for carrier aggregation deployment and organization in unlicensed bands, such as within LTE wireless communication network. A method may comprise scanning, by a transceiver within a base station, channels in a band of interest, reporting, by the transceiver, signal measurement information to the base station, cell searching, by the transceiver, channels in the band of interest, determining channel information for neighboring each channel, and transmitting, by the transceiver, the channel information to the base station.

Further described herein is a method comprising receiving, by a base station, channel information from a plurality of neighboring cells in a band of interest, receiving, by the base station, neighboring base station configuration information to a further base station, wherein the further base station is on a different network from the base station, identifying, by the base station, useable channels in an unlicensed band within the band of interest, hopping communication from a first channel to a second channel using a secondary cell drop/add mechanism.

Further described herein is a base station comprising a transceiver, a non-transitory memory having a program stored thereon, and a processor executing the program, wherein the execution of the program causes the processor to perform operations comprising scanning, by the transceiver, channels in a band of interest, reporting, by the transceiver, signal measurement information to the base station, cell searching, by the transceiver, channels in the band of interest, determining channel information for neighboring each channel, and transmitting, by the transceiver, the channel information to the base station.

Further described herein is a non-transitory computer readable storage medium with an executable program stored thereon, wherein the program instructs a processor to perform the following operations, comprising scanning, by a transceiver within a base station, channels in a band of interest, reporting, by the transceiver, signal measurement information to the base station, cell searching, by the transceiver, channels in the band of interest, determining channel information for neighboring each channel, and transmitting, by the transceiver, the channel information to the base station.

The exemplary embodiments may be further understood with reference to the following description and the appended drawings, wherein like elements are referred to with the same reference numerals. The exemplary embodiments show systems and methods for carrier aggregation deployment and organization in unlicensed bands. As will be described in great details below, exemplary embodiments described herein may allow for a network, such as an LTE network, to use a primary carrier ("PCell") to schedule data as per normal operations (e.g., licensed scheduled operations), and allow for a second carrier ("SCell") to be added for communications in an ISM band or an unlicensed band.

The exemplary embodiments are described with reference to the LTE-Advanced carrier aggregation scheme that has certain characteristics. For example, in frequency-division duplexing ("FDD"), the characteristics include that the number of aggregated carriers may be different in DL and uplink ("UL"), typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the PCell, served by the primary component carrier ("PCC") for uplink ("UL") and downlink ("DL"). It is also on the DL PCC that the UE receives non-access stratum ("NAS") information, such as security parameters. In idle mode, the UE listens to system information on the DL PCC. The UL PCC is used to send the physical uplink control channel ("PUCCH").

The other component carriers maybe referred to as secondary component carriers ("SCC") for UL and DL, serving the SCells. The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures. In carrier aggregation, the SCell is considered an augmentation to the PCell, wherein SCell activation and deactivation is achieved quickly by MAC signaling. The functionality of conventional carrier aggregation is implemented at the MAC layer and below in the user plane. Accordingly, the packet data convergence protocol ("PDCP") layer and the radio link control ("RLC") layer do not have any influence on which carrier particular RLC and PDCP protocol data units ("PDUs") should be sent. It is noted that the terms packet and PDU may be used interchangeably throughout the descriptions herein.

In current cellular systems, communications are only scheduled in licensed band. However, industrial, scientific and medical ("ISM") radio bands are unlicensed bands (e.g., portions of the radio spectrum) reserved for the use of radio frequency ("RF") energy for industrial, scientific and medical purposes other than telecommunications. One skilled in the art would understand that the use of designated ISM band within individual countries in these sections may differ due to variations in national radio regulations. In addition, communication devices using the ISM bands should tolerate any interference from ISM equipment, unlicensed operations are typically permitted to use these bands. Accordingly, unlicensed operation typically needs to be tolerant of interference from other devices, such as WiFi-enabled devices.

Furthermore, since the ISM band is an unlicensed band, multiple network providers may deploy a second carrier or a small cell in the unlicensed band as an LTE radio access technology ("RAT"). In that case, not only would LTE communications need to avoid WiFi interference, but these communications would also need to avoid colliding with and other LTE communications. The exemplary systems and methods described herein provide a mechanism to coordinate LTE communications from different network providers and deploy LTE communications in the ISM band, while avoiding WiFi interference. As discussed above, while network providers may use Pcells to schedule LTE data as per prior operations, the exemplary embodiments may add an SCell for communications through an LTE RAT in an unlicensed band (e.g., an ISM band). In the alternative, the network providers may deploy a small cell in the unlicensed band.

FIG. 2 shows an exemplary system 200 for carrier aggregation deployment and organization in an unlicensed band according to an embodiment described herein. The system 200 may include a base station, such as an LTE eNB 210. The LTE eNB 210 may include a transceiver 220 and a processor, such as a baseboard chip 230, and a memory 240. According, with the transceiver 220 and the baseband chip 230, the LTE eNB 210 may perform operations similar to that of a UE within the LTE network. The operations may include, but are not limited to scanning the network for other components, identifying the other components, measuring signal quality, reporting measurement results, etc.

FIG. 3 shows an exemplary method 300 for carrier aggregation deployment and organization in an unlicensed band according to an embodiment described herein. The operations performed by the method 300 will be described in reference to the system 200 and its components described above with reference to FIG. 2.

In step 310, the transceiver 220 in the eNB 210 may scan all channels within a band of interest. According to one embodiment, the scanning step 310 may be implemented by an energy detector or by power spectral density estimation. It may be noted that the power spectral density method may be used to differentiate a WiFi transmission from an LTE transmission. For instance, the power spectral density method may utilize some metrics on the in-band flatness, the roll-off criteria, etc.

In step 320, the transceiver 220 in the eNB 210 may measure signal information related to each of the channels, such as, but not limited to, the reference signal received power ("RSRP"), the reference signal received quality ("RSRQ"), the received signal strength indicator ("RSSI"), and link quality metrics, and report the measurement results to the eNB 210.

In step 330, the transceiver 220 in the eNB 210 may perform a cell search in all of the channels identified during the scanning step 310. Furthermore, the transceiver 220 may determine the Cell-ID, as well as read all of the system information block ("SIB") data in order to determine the network provider and the neighboring cells configurations.

FIG. 4 shows an exemplary SIB data 400 provided by the cells during the search according to an embodiment described herein. For instance, SIB1 contains information relevant when evaluating if a UE is allowed to access a cell. Furthermore, SIB1 contains cell access related information (e.g., a public land mobile network ("PLMN") identity list, tracking area code, cell identity, etc.), information for cell selection (e.g., minimum required Rx level in the cell and offset), p-Max, frequency band indicator, scheduling information, TDD configuration, SI-window length and system information value tag, etc. SIB2 contains radio resource configuration information that is common for all Ues. This configuration information includes cell access barring information, random access channel ("RACH") related parameters, idle mode paging configurations, PUCCH and PUSCH configurations, UL power control and sounding reference signal configurations, UL carrier frequency/bandwidth, etc.

In step 340, the eNB 210 may utilize the information collected by the transceiver 220 to generate a deployment topology of the neighboring cells and their identities, as well as important configuration information. For instance, the eNB 210 may now be able to select a Cell-ID that is not conflicting with neighboring cells. Furthermore, the eNB 210 may now be aware of any available channels within the unlicensed band that the eNB 210 may use.

In step 350, the eNB 210 may use the available RRC messages in Rel-10 to indicate the list of the channels discussed above to the transceiver 220 (e.g., ScellToAddMod-r10 RCC Information Element). In addition, the eNB 210 may use the mechanism of Scell Drop/Add to hop the communication from a first channel to a second channel.

FIG. 5 shows exemplary RRC messages 500 provided used by the LTE eNB according to an embodiment described herein.

According to an alternative embodiment, the eNB 210 may send configuration information to each of the UEs in the ISM bands to read all of the SIB information of the neighboring cells and report the SIB information to the serving cell. This configuration may be enabled by a gap measurement. More specifically, during this gap measurement, the UE may not receive any data from the serving eNB. The UE will read all of the neighboring eNBs, even if the UE is barred from the cell (e.g., the UE is not from a common network provider as the eNB). Accordingly, by configuring multiple UEs with these configurations, the servicing eNB may populate a mapping of the deployment topology in its vicinity.

Figure 6B:
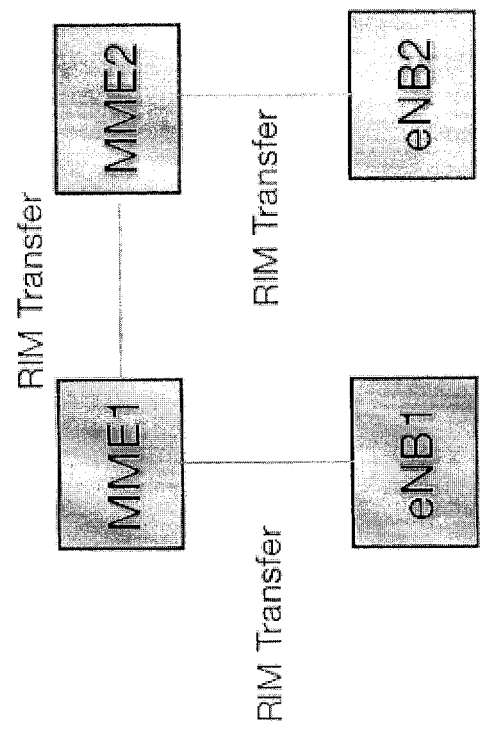
FIG. 6A-6C shows exemplary systems for exchanging information between multiple eNB according to an exemplary embodiment described herein.
Figure 6A:
Figure 6C:
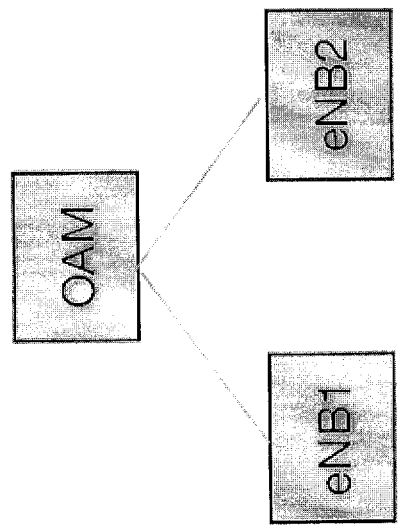

FIGS. 6A-6C shows exemplary systems 610, 620 and 630 for exchanging information between multiple eNB according to an exemplary embodiment described herein.

FIG. 6A shows a system 610 for exchanging information between eNB1 and eNB2 via an X2 interface. In current LTE systems, there is no X2 interface between eNBs if the eNBs belong to different network providers. According to system, X2 interfaces may be deployed between all eNBs. Furthermore, a new X2 procedure may be defined to exchange neighboring cell configuration information (e.g., similar to an eNB configuration update procedure).

FIG. 6B shows a system 620 for exchanging information between eNB1 and eNB2 via radio access network ("RAN") information management ("RIM") transfer across mobility management entities ("MMEs"), such as MME1 and MME2. The current RIM procedure is used between LTE and GSM/EDGE radio access network ("GERAN"), and not within LTE. The exemplary embodiments described herein may reuse the RIM procedure logic in LTE, or, alternatively, define a new S1 procedure to transfer eNB configuration information to the neighboring cells. Furthermore, the embodiments may deploy an S10 interface between MMEs from different network providers. Accordingly, the eNB1 may send its cell configuration information and PLMN information to the other cell within a RIM transfer message. The RIM transfer message may also include target Cell-ID routing information to allow the MME1 to find the correct MME, namely MME2. MME2 may then send the RIM transfer message to eNB2.

FIG. 6C shows a system 630 for exchanging information between eNB1 and eNB2 via an operation administration and maintenance ("OAM") server. In current LTE systems, the eNB belonging to different network providers only have an interface with their own OAM server. Different OAM servers from different network providers have no interface. According to the exemplary embodiments, eNBs may have interfaces with the same OAM server. Alternatively, or in addition, different OAM servers belonging to different network providers may have interfaces to share information. Therefore, eNB1 may send the cell configuration and network information to the OAM server, wherein the OAM server may forward this information to eNB. Thus, each of eNB1 and eNB2 may now know its neighboring cell information.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   scanning, by a transceiver within a base station, channels in a band of interest;
   reporting, by the transceiver, signal measurement information for each of the channels to the base station;
   cell searching, by the transceiver, channels in the band of interest;
   determining channel information for neighboring cells in each channel, wherein the channel information includes Cell-ID information, system information block ("SIB") information, and provider information; and
   transmitting, by the transceiver, the channel information to the base station.

2. The method of claim 1, further comprising:
   receiving, by the base station, the channel information from a plurality of neighboring cells in the band of interest;
   identifying, by the base station, useable channels in an unlicensed band within the band of interest; and
   hopping communication from a first channel to a second channel using a secondary cell drop/add mechanism.

3. The method of claim 1, further comprising:
   sending, by the base station, configuration information to a user equipment ("UE") in the band of interest to read all system information block ("SIB") information;
   reading, by the base station, configuration information from neighboring base stations;
   configuring a plurality of further UEs with the neighboring base station configuration information; and
   populating a topology map of UE and base station deployment.

4. The method of claim 1, wherein the signal measurement information includes one of a reference signal received power ("RSRP"), a reference signal received quality ("RSRQ"), a received signal strength indicator ("RSSI"), and a link quality metrics to the base station.

5. A method, comprising:
   receiving, by a base station, channel information from a plurality of neighboring cells in a band of interest, wherein the channel information includes Cell-ID information, system information block ("SIB") information, and provider information;
   receiving, by the base station, neighboring base station configuration information to a further base station, wherein the further base station is on a different network from the base station;
   identifying, by the base station, useable channels in an unlicensed band within the band of interest;
   hopping communication from a first channel to a second channel using a secondary cell drop/add mechanism.

6. The method of claim 5, wherein the neighboring base station configuration information is transmitted from the base station to the further base station via one of an X2 interface, a RIM transfer, and a OAM server.

7. A base station, comprising:
   a transceiver;
   a non-transitory memory having a program stored thereon; and
   a processor executing the program, wherein the execution of the program causes the processor to perform operations comprising:
      scanning, by the transceiver, channels in a band of interest,
      reporting, by the transceiver, signal measurement information for each of the channels to the base station,
      cell searching, by the transceiver, channels in the band of interest,
      determining channel information for neighboring cells in each channel, wherein the channel information includes Cell-ID information, system information block ("SIB") information, and provider information, and
      transmitting, by the transceiver, the channel information to the base station.

8. The base station of claim 7, wherein the operations further comprise:
   receiving, by the base station, the channel information from a plurality of neighboring cells in the band of interest,
   identifying, by the base station, useable channels in an unlicensed band within the band of interest, and
   hopping communication from a first channel to a second channel using a secondary cell drop/add mechanism.

9. The base station of claim 7, wherein the operations further comprise:
   sending, by the base station, configuration information to a user equipment ("UE") in the band of interest to read all system information block ("SIB") information, reading, by the base station, configuration information from neighboring base stations, configuring a plurality of further UEs with the neighboring base station configuration information, and populating a topology map of UE and base station deployment.

10. The base station of claim 7, wherein the signal measurement information includes one of a reference signal received power ("RSRP"), a reference signal received quality ("RSRQ"), a received signal strength indicator ("RSSI"), and a link quality metrics to the base station.

11. The base station of claim 7, wherein the operations further comprise:

sending, by the base station, neighboring base station configuration information to a further base station, wherein the further base station is on a different network from the base station.

12. The base station of claim 11, wherein the neighboring base station configuration information is transmitted from the base station to the further base station via one of an X2 interface, a RIM transfer, and a OAM server.

13. A non-transitory computer readable storage medium with an executable program stored thereon, wherein the program instructs a processor to perform the following operations, comprising:

scanning, by a transceiver within a base station, channels in a band of interest;

reporting, by the transceiver, signal measurement information for each of the channels to the base station;

cell searching, by the transceiver, channels in the band of interest;

determining channel information for neighboring cells in each channel, wherein the channel information includes Cell-ID information, system information block ("SIB") information, and provider information; and transmitting, by the transceiver, the channel information to the base station.

14. The computer readable storage medium of claim 13, wherein the operations further comprise:

receiving, by the base station, the channel information from a plurality of neighboring cells in the band of interest;

identifying, by the base station, useable channels in an unlicensed band within the band of interest; and hopping communication from a first channel to a second channel using a secondary cell drop/add mechanism.

15. The computer readable storage medium of claim 13, wherein the operations further comprise:

sending, by the base station, configuration information to a user equipment ("UE") in the band of interest to read all system information block ("SIB") information;

reading, by the base station, configuration information from neighboring base stations;

configuring a plurality of further UEs with the neighboring base station configuration information; and populating a topology map of UE and base station deployment.

16. The computer readable storage medium of claim 13, wherein the operations further comprise:

sending, by the base station, neighboring base station configuration information to a further base station, wherein the further base station is on a different network from the base station.

* * * * *